United States Patent [19]

Doyen et al.

[11] Patent Number: 4,631,910
[45] Date of Patent: Dec. 30, 1986

[54] MOWER, ESPECIALLY FOR GRASS AT AIRPORTS

[75] Inventors: Hans-Henning Doyen, Neustadt-Konigsbach; Edgar Hühn, Mörfelden-Walldorf, both of Fed. Rep. of Germany

[73] Assignees: Ing. Alfred Schmidt GmbH, St. Balsien; Flughafen Frankfurt/Main AG, Frankfurt am Main, both of Fed. Rep. of Germany

[21] Appl. No.: 681,219

[22] Filed: Dec. 13, 1984

[30] Foreign Application Priority Data

Dec. 13, 1983 [DE] Fed. Rep. of Germany ....... 3344987

[51] Int. Cl.⁴ .................... A01D 50/00; A01D 50/02; A01D 69/08
[52] U.S. Cl. ........................................ 56/505; 56/12.7
[58] Field of Search ................ 56/294, 504, 505, 12.7; 241/101.7

[56] References Cited

U.S. PATENT DOCUMENTS

| 2,734,328 | 2/1956 | Wood | 56/294 |
| 2,758,435 | 8/1956 | Lundell | 56/12.7 |
| 3,599,412 | 8/1971 | Lefeuvre | 56/505 |
| 3,678,671 | 7/1972 | Scarnato et al. | 56/294 |

FOREIGN PATENT DOCUMENTS 2628553 12/1977 Fed. Rep. of Germany ........ 56/504

Primary Examiner—Robert Peshock
Assistant Examiner—David I. Tarnoff

[57] ABSTRACT

A mower especially suited for mowing fields at airports has a plurality of blades connected to a rotatable shaft and includes a fixed bed knife arranged parallel to the rotatable shaft and inclined at 20 to 60 degrees relative to a horizontal plane passing through the shaft rotating axis, the bed knife having a toothed profile of a shape complementary to the shape of the outer end portions of the chopping blades with which the toothed profiles are adapted to intermesh during rotation of the chopping blades relative to the fixed bed knife.

4 Claims, 3 Drawing Figures

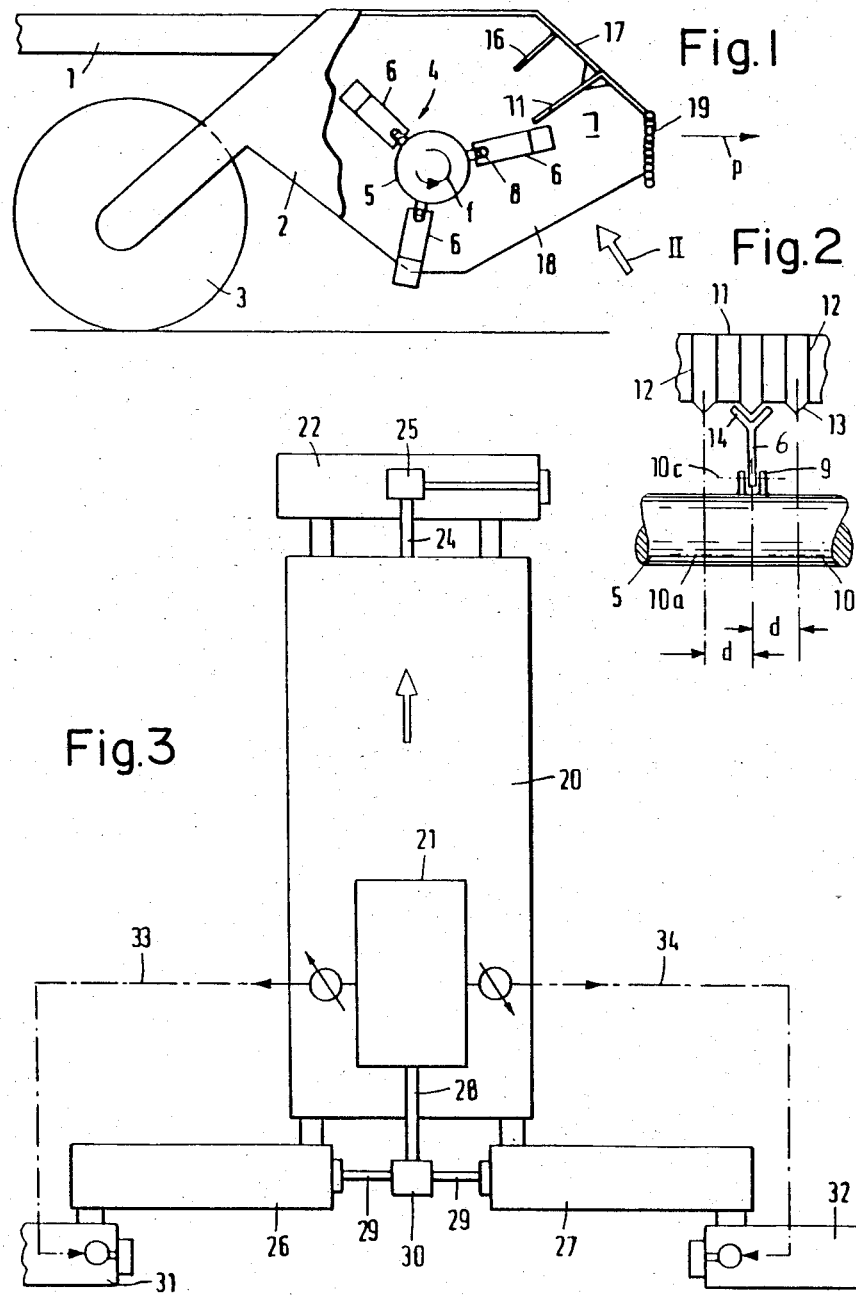

MOWER, ESPECIALLY FOR GRASS AT AIRPORTS

The invention involves a mower, especially for grass at airports. In prior mowers used at these sites, the main goal was to cover the largest possible area. Development was therefore along the lines of devices that cut broad areas and move at high speeds.

According to new studies of biotopes at airports, grass from 20 to 50 cm high and preferably about 30 cm, will eliminate flocks of birds known to be dangerous to air traffic. This is because deep grass discourages birds from landing. In addition, soaring birds of prey are no longer able to see mice running along the ground.

Known mowers are not appropriate for cutting grass to the desired height of 30 cm and above. While the usual rotary mowers, in which the cutting blades rotate around a horizontal axis, make it possible to cut grass to 18 cm in height, the maximum cutting height for sickel-bar mowers, in which the cutting blades rotate around a vertical axis, is only 10 cm.

There are also so-called flail mowers. These are mowers in which suspended movable cutting blades rotate around a horizontal axis and break down even thick brush and thorny undergrowth. Flail mowers are thus preferable for fields which contain a large percentage of foreign bodies and are therefore more commonly used in forestry and public works applications than in agriculture. Regular flail mowers are unsuitable for leaving grass more than 10 cm high because the grass is flattened under the cutting blades at this height.

In a known multi-purpose device (German Publication 24 36 308) designed particularly for taking, chopping and arranging straw in windrows, there is a rotating mowing drum with hinged chopping blades that turn around a horizontal axis in a kind of flail mower that is located in a housing which is open in front and below. The flail mower is designed like a paddle wheel and from its rotational speed of 2150 rpm, it creates a strong suction which sucks the mowed material upwards, to be chopped by blades attached to the top of the housing and then blown out as chaff through a discharge shaft located in the upper housing. The chaff in this case is relatively rough and long. The known mower is unsuitable for cutting grass that is to be left higher because the grass bends over, causing the grass to be cut unevenly.

In contrast, the purpose of the present invention is a mower that has a large cutting capacity, is suitable for mowing grass to lengths of 30 cm or higher and creates cleanly cut grass with particularly short clippings.

Such a mower includes the characteristics (a) to (g) listed in claim 1. It is basically a flail mower. In combination with a bed knife on the front part of the housing, which has a profile that corresponds to the envelope of the flail mower and almost touches it, it becomes possible to chop tall grass especially fine in a narrow pressure area created by the bed knife inside the housing, so that the clippings drop on the ground among the remaining grass and serve as mulch. As a result of the narrow pressure area, the high rpm number of the mower means that the grass cuttings are repeatedly chopped by blades of the flail mower, so that it drops to the grass only after it has been chopped into very small pieces. While previous grass mowing techniques at airports required 5 to 8 mowings per year, to keep grass at the height of 30 cm recommended in the study mentioned earlier requires only two mowings per year. Moreover, the customary close cut at the start of the winter with removal of clippings can be eliminated. In summer, the grass may grow to a height of up to 90 cm; it is then mowed in one cutting to a height of 25 to 30 cm. The essential point is that the clippings are chopped to very small pieces by the mower, ideally about 5 cm. Naturally, the proposed mower can also be used to cut lawns as well as areas requiring long grass.

As part of the invention, the flail mower should rotate at 2,400 rpms. By adjusting the rpms, the desired grass length can be obtained, since the cutting height increases proportionally with the rpms.

The arrangement of the bed knife forwardly of the flail mower and at the angle of inclination hereinafter disclosed is essential for the creation of the pressure area the between the bed knife and the housing. Long grass is caught in this pressure area and sent repeatedly through the cutting blades of the flail mower, to be chopped into very small pieces. The resulting pieces then fall to the ground through both the front and the back of the flail mower.

To achieve particularly effective pressure with the bed knife, the bed knife has a toothed profile and the end pieces of the cutting blades of the flail mower describe an envelope that fits into the tooth profile of the bed knife.

For further reduction of the length of the chopped grass, it can be useful to attach one or more chopping blades to the housing, lying in the direction of rotation past the bed knife and parallel to it in the top of the housing. In a useful development, such chopping blades can be arranged radially to the axis of rotation, with or without teeth; these blades are farther from the envelope of the rotating flail mower than the bed knife.

To achieve larger cutting areas, as is known, a number of separate mower units can be combined to a single mower as back and front additions to a tractor. Below is a description of a power system for a number of mowers using mowing units of the recomended type, in which a first mowing unit is attached closest to its width on the front of the tractor and additional mowing units are attached to the back of the tractor in pairs, set off to the side of the front mowing unit so that the pairs of mowing units attached to the back are staggered, and in which at least one additional motor independent of the tractor motor is attached to drive the back mowing units.

Such a power system with one front mowing unit and two back mowing units can mow a strip about 9 m wide. This means that at a velocity of 8 to 10 km/h, about 8 to 10 ha can be mowed per hour, whereby the capacity of the regular and built-on motors together should be about 400 KW.

Below is an example of one version of a mower according to the invention and an appropriate power system, which is a combination of several mowers, as illustrated in the drawing.

It shows:

FIG. 1 a vertical cross-section through a mower, perpendicular to the axis of rotation, shown schematically.

FIG. 2 a partial view under arrow 11 of FIG. 1 of the bed knife and flail mower and FIG. 3 a power system shown schematically with a number of mowing units.

FIG. 1 shows a vertical cross-section through a mower attached to the front of a tractor (not shown) by horizontal brace 1. The mower can be driven by a power tap on the tractor (not illustrated) that is connected to the mower power unit. The mower consists of housing 2, which is moved along the ground by caster wheels on opposite sides. In the open housing 2 of the mower, the actual mower, shown in the form of a flail mower 4, can be seen. This includes a shaft that rotates in the direction of arrow f and is disposed perpendicular to the direction of movement, along which chopping blades 6 are arranged. The version shown has three rows of chopping blades 6, which are arranged at an angle of 120° along the whole length of shaft 5 of the flail mower 4. It is clear from FIG. 2 that each chopping blade 6 consists of a Y-shaped member which is pivotally attached at one end by a bolt 8 between radially welded lugs 9 on shaft 5; by this method of attachment, each chopping blade is attached axially, so that it can only be pivoted around a bolt 8 within a radial plane. In FIG. 2, the bolt shafts 10a, 10b, 10c are drawn in three adjacent chopping blades 6, with the left bolt shaft 10a visible on the front side and right bolt shaft 10b assumed to be on the hidden back side of shaft 5. The axial distance between two adjacent chopping blades 6 is shown in FIG. 2 by "d".

A bed knife 11 attached inside the housing 2 has teeth 12 whose pointed ends 13 fit between the angle formed by two legs 14 on the ends of the Y-shaped chopping blades 6. In this way, the profile of the bed knife 11 is toothed with the profile of the envelope of the flail mower. This arrangement creates the pressure area 7 below the bed knife 11. The mowed grass, which is still in long pieces, is retained by the bed knife 11 long enough for the repeated effect of the chopping blades 6 in the pressure area 7 to chop them into small pieces. The chopped clippings then fall down out of the housing on both sides of shaft 5. For the additional swirling and secure retention of all long grass, a chopper 16 is attached to the inside of the front housing wall 17.

Housing 2 is closed on the sides. In FIG. 1, one side wall is cut away so that only the opposite wall 18 can be seen. Below, housing 2 is open, both in front and back. At the front mower opening there is a chain curtain 19. Arrow p shows the mowing direction of the mower.

FIG. 3 shows a plan view of the power system. A tractor 20 with built-on motor 21 has a mower unit 22, which is wider than the tractor 20, attached to the front. This mower 22 is driven by a power tap on the front side of the tractor through guide drive 25. In the back, two pairs of additional mowers are attached to tractor 20 and staggered in relation to each other. The first pair of two mowing units 26, 27 directly connected to the vehicle back is driven through power tap 28 of drive motor 21 through a drive shaft 29 of a common power unit 30. These two mowing units 26,27 correspond in their mowing width to the front mower unit 22. The outer pair of the mower units attached to the back consists of two smaller mowers 31,32, each attached to the housing of the mower units 26,27 that are in front of them. The two outer back mower units 31,32 are driven by the hydraulic circuits 33,34 of the built-on motor 21.

It can be assumed that each of the three larger mowing units 22,26,27 has a cutting width of 2.50 m, while the smaller back mowers 31,32 mow 1.75 m each. The combined cutting width of the system is therefore about 9 m.

We claim:
1. A mower for cutting grass to predetermined height at airports, comprising
 (a) a housing at least partially open at its front end and completely open at its bottom,
 (b) a flail mower within the housing and having a horizontal shaft disposed perpendicular to the direction of movement of the mower, and individual swingably mounted chopping blades connected at one of their ends along the shaft and being axially non-displaceable, each chopping blade at its opposite end defining a V-shaped recess;
 (c) said flail mower rotating, with reference to its upper motion, opposite to the direction of mowing;
 (d) the flail mower rotating at more than 1500 rpm;
 (e) a flat bed knife fixedly attached to the housing in front of, above the axis of rotation of and generally parallel to the flail mower;
 (f) the flat bed knife being at an angle of 20° to 60° above and with respect to a horizontal plane passing through the shaft axis of rotation, said bed knife terminating in V-shaped members of a shape complementary to the shape of the V-shaped recess of said chopping blades, said V-shaped recess defining envelope means of a size and related to the V-shaped members to permit rotation of said flail mower relative to said bed knife, said envelope means of said chopping blades during said relative rotation enveloping said V-shaped members of said bed knife as said chopping blades rotate past the fixed bed knife whereby the V-shaped members of the bed knife mesh with said envelope means of said chopping blades, said individual chopping blades being disposed in axially spaced apart relation along the shaft and being also angularly offset relative one another about a circumference of the shaft, said knife blade V-shaped members defining a plurality of tooth profiles spaced relative one another for alignment with and reception within the envelope means during rotation of the chopping blades.

2. A mower according to claim 1, wherein said V-shaped recesses of the chopper blades of the flail mower is defined by two legs which at least partially fit into two nearby gaps in the teeth of the bed knife during rotation.

3. A mower according to claim 1, wherein parallel to the bed knife in an upper section of the housing there is fixedly attached to the housing at least one chopper behind the bed knife, viewed in relation to the direction of rotation of the flail mower.

4. The mower of claim 1, wherein each chopping blade swings about an axis parallel to a longitudinal axis of the shaft.

* * * * *